F. SIMON & J. W. SCOTT.
FEEDING MEANS OF PERCUSSIVE ROCK DRILLS, COAL CUTTERS, AND THE LIKE.
APPLICATION FILED AUG. 26, 1913.
1,146,356.
Patented July 13, 1915.
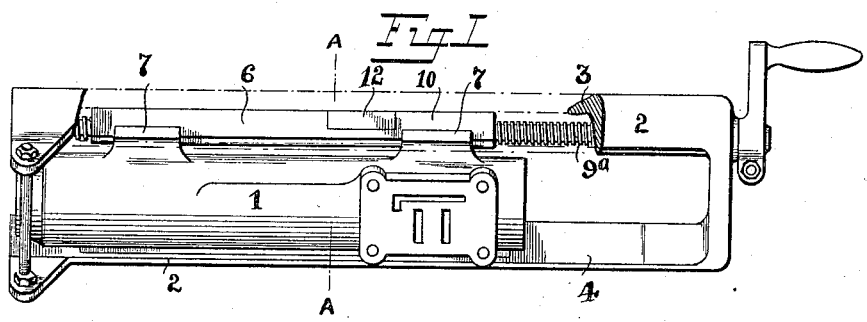
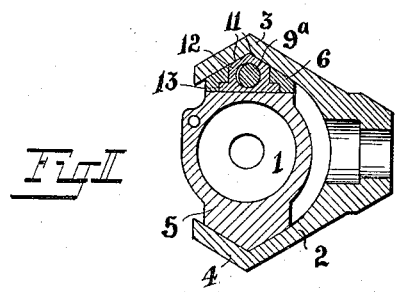
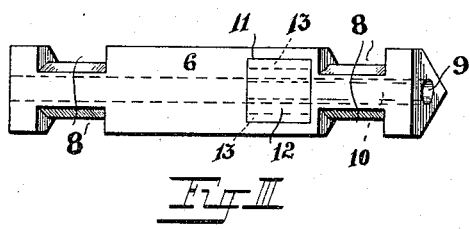

UNITED STATES PATENT OFFICE.

FRANK SIMON AND JOHN WILLIAM SCOTT, OF MINNAAR, TRANSVAAL, SOUTH AFRICA.

FEEDING MEANS OF PERCUSSIVE ROCK-DRILLS, COAL-CUTTERS, AND THE LIKE.

1,146,356.　　　　　　　　Specification of Letters Patent.　　Patented July 13, 1915.

Application filed August 26, 1913. Serial No. 786,758.

*To all whom it may concern:*

Be it known that we, FRANK SIMON and JOHN WILLIAM SCOTT, both British subjects, residing at the Tweefontein Collieries, Limited, Minnaar, in the Province of the Transvaal, Union of South Africa, have invented a new and useful Improvement in Feeding Means of Percussive Rock-Drills, Coal-Cutters, and the like; and we do hereby declare the following to be a full, clear, and exact description of the same.

The present invention relates to feeding means of percussive rock drills, coal cutters and the like in which the machine proper is provided with a renewable slipper adapted to work in a suitable cradle and arranged as the nut for the feed screw of the machine.

The invention is illustrated in the accompanying drawings, in which:

Figure I is a perspective view of the machine cylinder and cradle of a percussive coal cutter with part broken away. Fig. II is a section on the line A—A, Fig. I; and Fig. III is a perspective view of the slipper detached from the machine.

1 is the machine cylinder and 2 the cradle therefor comprising the two longitudinal V-sectioned members 3, 4. On one side of the cylinder is a fixed slipper 5 working in one of said longitudinal members and on the other side of the cylinder is a similar but renewable slipper 6. Lugs 7 on cylinder 1 engage slots 8 in slipper 6, so that said parts are securely held together while assembled with the cradle.

The feed screw $9^a$ passes through a hole 9 bored longitudinally through slipper 6. As previously constructed, part 10 of the bore was threaded to form a nut into which the feed screw engaged for the purpose of traversing the cylinder in the cradle. It has, however, been found in practice that the life of such renewable slipper 6 is limited by the life of its screw threads which are frequently worn out while said part is still of service as a slipper.

The object of this invention is to separably provide the slipper with a nut which may readily be renewed when worn.

According to this invention, slipper 6 is formed with a recess 11 which intersects the bore 9 for feed screw $9^a$. Preferably, and as shown, such recess is carried right through the slipper and is rectangular in shape. The renewable nut 12 is fitted into recess 11 and is retained therein by the feed screw $9^a$. If desired, also, the nut may be fitted on one side with a flange 13 and recess 11 correspondingly formed to receive the same. Moreover, when the renewable slipper 6 is in place, the nut is retained therein, independently of feed screw $9^a$, by the machine cylinder on the one side and the guiding surface of the cradle on the other. This manner of retaining the nut renders it readily renewable whenever it becomes worn without the necessity of supplying and fitting a new slipper.

What we claim and desire to secure by Letters Patent is:—

1. A renewable slipper for a percussive rock drill, coal cutter and the like, said slipper being bored longitudinally for the reception of a feed screw and provided with a recess intersecting said bore and adapted to receive a separable feed nut.

2. In a percussive machine, the combination of a cradle, a cylinder provided with a fixed slipper and with a renewable slipper both slidably engaging the cradle, and a nut separably carried by the renewable slipper for engagement with a feed screw.

3. In a percussive machine, the combination of a cradle having two oppositely-disposed V-sectioned members, a cylinder provided with a fixed slipper and with a renewable slipper both formed to slidably engage the V-sectioned members, and a nut separably carried by the renewable slipper for engagement with a feed-screw.

4. In a percussive machine, the combination of a cradle, a cylinder provided with a renewable slipper slidably engaging the cradle, said slipper being apertured for the reception of a feed screw and having a recess, and a nut for engagement with a feed screw and separably retained in the recess by the cylinder and the cradle.

5. In a percussive machine, the combination of a cylinder, a cradle, a renewable slipper attached to the cylinder and working in the cradle, said slipper being apertured for the reception of a feed screw, and a separable nut in the slipper for the feed screw to engage with.

In testimony whereof, we have signed our names to this specification in the presence of two subscribing witnesses.

FRANK SIMON.
JOHN WILLIAM SCOTT.

Witnesses:
D. C. PEILMIS,
FRANK GILBERT.

Copies of this patent may be obtained for five cents each, by addressing the "Commissioner of Patents, Washington, D. C."